July 7, 1936.    R. L. SHULTZ    2,046,657
LIFTING JACK ATTACHMENT
Filed Nov. 13, 1935
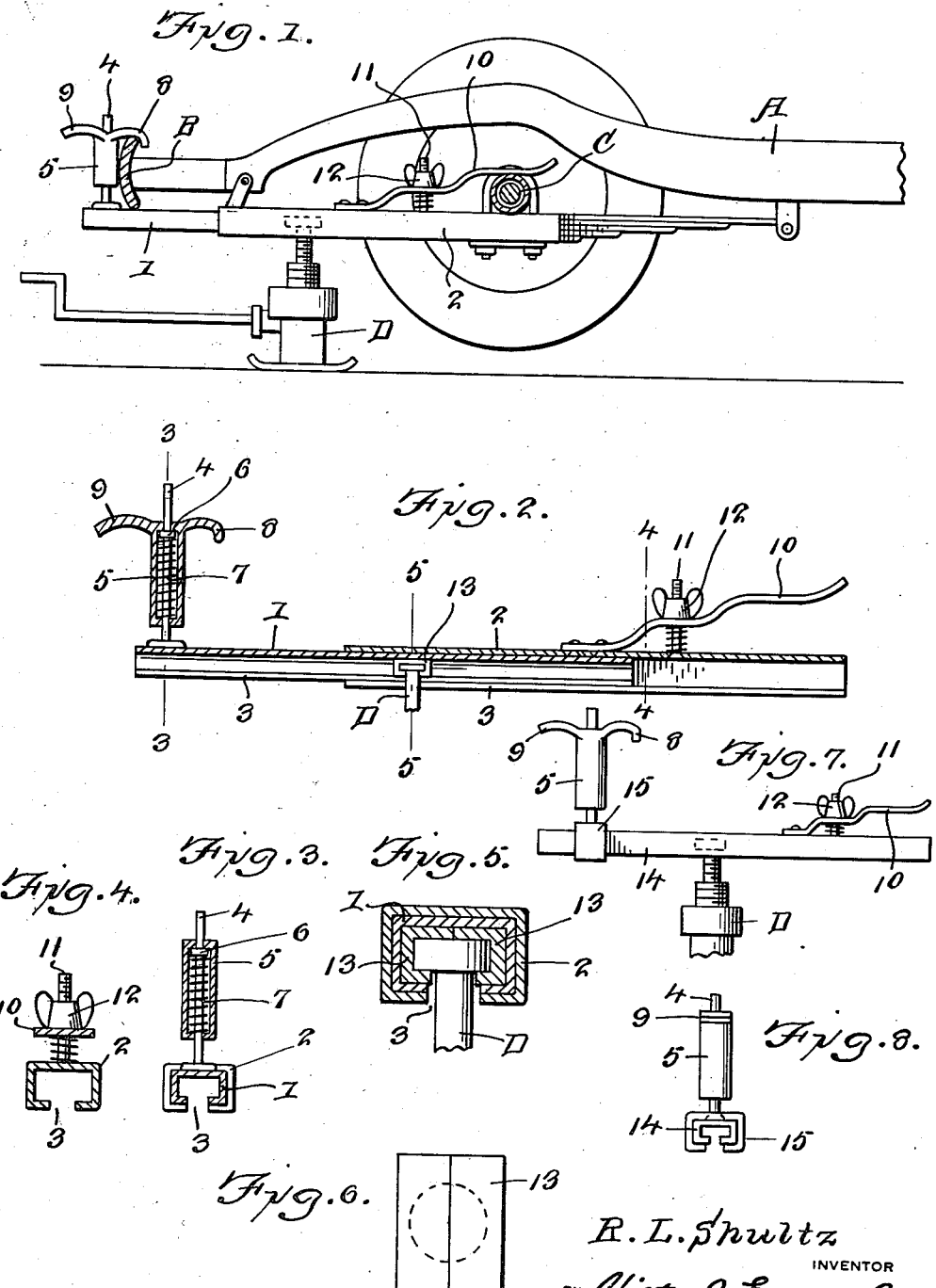
R. L. Shultz
INVENTOR
BY Victor J. Evans & Co.
ATTORNEY Patented July 7, 1936

2,046,657

UNITED STATES PATENT OFFICE 2,046,657

LIFTING JACK ATTACHMENT

Robert L. Shultz, Prague, Okla.

Application November 13, 1935, Serial No. 49,591

2 Claims. (Cl. 254—133)

This invention relates to lifting jack attachments, and its general object is to provide a device of that character for guiding and supporting a jack with respect to a motor vehicle, without necessitating the operator getting under the vehicle, in that the jack can be guided to a proper jacking position and held accordingly while in use, and displacement or falling of the jack is impossible.

A further object of the invention is to provide a jack attachment for use with motor vehicles, that can be easily and expeditiously applied and removed with respect to the vehicle, and the jack can be used with the attachment accordingly.

Another object of the invention is to provide a guide and supporting device for a vehicle jack, that is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a side elevation illustrating the use of my attachment with a motor vehicle, with a jack applied thereto.

Figure 2 is a longitudinal sectional view taken through the attachment, with parts in elevation.

Figure 3 is a sectional view taken approximately on line 3—3 of Figure 2.

Figure 4 is a sectional view taken approximately on line 4—4 of Figure 2.

Figure 5 is a sectional view taken approximately on line 5—5 of Figure 2.

Figure 6 is a top plan view of the jack head attachment or enclosure therefor to provide a fitting association of the jack with respect to the device.

Figure 7 is a side elevation of a modified form.

Figure 8 is a front view thereof.

Referring to the drawing in detail, the letter A indicates the frame of a motor vehicle having a bumper B secured thereto, and C is the rear axle. While I have illustrated my attachment associated with the rear portion of a motor vehicle, it will be obvious that it can be applied to the front thereof.

In Figures 1 to 5 inclusive, I have illustrated one form of my invention which includes a pair of telescopically mounted channel members 1 and 2, with the channel member 1 slidably mounted within the channel member 2, so that the length of the device is adjustable to fit various motor vehicles, as will be apparent. The individual channel members may be of any length, and they are identical in shape, in that they include closed upper and side walls while the rear walls thereof are slotted longitudinally as at 3 to provide a passageway for the stem of a jack D which is shown as being of a well known construction, and of course forms no part of the present invention.

The channel member 1 has secured to the upper wall adjacent to the rear end thereof, by any suitable means, a stem 4 that rises therefrom and the stem 4 provides a part of bumper clamping means which likewise includes a sleeve 5 having openings in the upper and lower ends thereof for the passage of the stem 4, whereby the sleeve is mounted for slidable movement thereon, but is limited by a stop 6 fixed to the stem 4 and a coil spring 7 that has its end convolutions engaging the stop 6 and the bottom of the sleeve, as clearly shown in Figure 2, consequently it will be seen that the sleeve is spring pressed to set up a clamping association with respect to the bumper, in a manner which will be presently apparent. Formed with and extending forwardly from the upper end of the sleeve is a jaw 8, while extending rearwardly from the upper end of the sleeve is a handle 9, by which the sleeve can be raised for disposing the jaw 8 over the upper edge of the bumper bar for clamping the rear end of the device thereto, as clearly shown in Figure 1.

The device is likewise clamped to the rear axle C, and for that purpose I employ an arm 10 in the form of a relatively stiff leaf spring, that has one end riveted or otherwise secured to the upper wall of the member 2, and thence is disposed at an upward and forward inclination therefrom in a manner to provide a flat portion having an opening therein for the passage of a screw bolt 11 that is fixed to the member 2 at its lower end and receives a thumb nut 12 to contact the flat portion, and whereby the free portion of the arm 10 is held engaged with the axle for clamping the latter between the free portion and the upper wall of the member 2, as shown in Figure 1. The free portion of the arm 10 is outwardly flared to facilitate the application of the device with respect to the rear axle. The bolt 11 may have surrounding the same a coil spring, as shown, with its end convolutions contacting the bottom of the flat portion of the arm 10 and the top wall of the channel member 2.

The attachment for the jack head, as shown, is in the form of a housing 13 that is split to provide sections whereby it can be applied to the head, and the housing is of a size to slidably fit the channel of the member 1.

In Figures 7 and 8, I have illustrated a slightly modified form of my invention, and this form includes a single channel member 14 having secured thereto an axle clamping means identical with that previously described, but in place of the channel member 1, I employ a collar 15 of a shape to slidably fit the channel member 14. The collar has secured thereto a bumper bar clamping means similar to that secured to the channel member 1.

In the use of my device, it will be obvious that it is clamped to the bumper bar and the rear axle in the manner as shown in Figure 1. The housing 13 is then applied to the head of the jack D, and the housed head is inserted in the outer end of a channel member, thence the jack is moved to a position appropriate for lifting the vehicle.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A lifting jack attachment for a motor vehicle, comprising channeled means to receive, guide and support a jack, a spring pressed sleeve mounted on the channeled means, a jaw carried by the sleeve, a handle on the sleeve for disposing the jaw in clamping association with a portion of the vehicle, a spring pressed arm mounted on the channeled means and having an outwardly flared portion, and means for disposing the spring pressed arm in clamping association with respect to a portion of the vehicle for cooperation with the jaw for securing the attachment to the vehicle.

2. A lifting jack attachment for a motor vehicle, comprising channeled means to receive the head of a jack to guide and support the latter for adjustment longitudinally thereof, said channeled means including adjustably mounted fittingly associated telescopically mounted sections, a spring pressed sleeve mounted on one of said sections, a jaw carried by the sleeve, a handle on the sleeve for disposing the jaw in clamping association with a portion of the vehicle, a spring pressed arm mounted on the other section, screw means engageable with the arm for disposing the latter in clamping association with respect to a portion of the vehicle for cooperation with the jaw for detachably securing the attachment to the vehicle.

ROBERT L. SHULTZ.